United States Patent
Mufti et al.

(10) Patent No.: US 9,509,853 B2
(45) Date of Patent: Nov. 29, 2016

(54) SIP IMS CALL FORKING TO MULTIPLE ASSOCIATED DEVICES

(71) Applicant: T-Mobile U.S.A., Inc., Bellevue, WA (US)

(72) Inventors: Shujaur Mufti, Snoqualmie, WA (US); Shelby Seward, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/735,081

(22) Filed: Jun. 9, 2015

(65) Prior Publication Data

US 2016/0156783 A1    Jun. 2, 2016

Related U.S. Application Data

(60) Provisional application No. 62/086,092, filed on Dec. 1, 2014.

(51) Int. Cl.
*H04W 40/20* (2009.01)
*H04M 7/00* (2006.01)

(52) U.S. Cl.
CPC ............. *H04M 7/006* (2013.01); *H04W 40/20* (2013.01)

(58) Field of Classification Search
CPC ..................................................... H04W 4/16
USPC .................................. 455/445–447, 413–415
See application file for complete search history.

(56) References Cited

U.S. PATENT DOCUMENTS

| | | | |
|---|---|---|---|
| 8,417,224 B1 * | 4/2013 | Young | H04M 3/53333 370/230 |
| 2009/0191871 A1 | 7/2009 | Siegel et al. | |
| 2009/0328144 A1 | 12/2009 | Sherlock et al. | |
| 2011/0264824 A1 * | 10/2011 | Venkata Subramanian | H04L 65/1016 709/238 |
| 2011/0293084 A1 | 12/2011 | Bhagavatula et al. | |
| 2013/0065567 A1 * | 3/2013 | Cui | H04M 7/006 455/415 |
| 2013/0308632 A1 | 11/2013 | Keller et al. | |

FOREIGN PATENT DOCUMENTS

WO    2009097032 A1    8/2009

OTHER PUBLICATIONS

International Searching Authority, International Search Report and Written Opinion, PCT Application PCT/US2015/063045, mailed Mar. 22, 2016, 12 pages.

* cited by examiner

*Primary Examiner* — Michael T Vu
(74) *Attorney, Agent, or Firm* — Perkins Coie LLP

(57) ABSTRACT

A system and method that fork incoming calls to a destination device or a device that is associated with the destination device is disclosed. The system receives a request to register multiple device for IMS services, receives an incoming call to a destination mobile device, identifies one or more associated mobile devices, and determines one or more forked devices. The system transmits a first notification to each forked device, the first notification indicating that the forked device may accept or reject the incoming call request, and the system receives an acceptance or rejection from one or more forked devices.

20 Claims, 9 Drawing Sheets

```
?xml version="1.0"?><reginfo xmlns="urn:ietf:params:xml:ns:reginfo" version="1" state="full">
  <registration aor="sip:xx@xx" id="x" state="active">
    <contact id="x" state="active" event="created">
      <uri>sipxx@xx</uri>
      <unknown-param name="+g.3gpp.icsi-ref">"urn%3Aurn-7%3A3gpp-service.ims.icsi.mmtel" </unknown-param>
      <unknown-param name="+g.3gpp.smsip" />
      <unknown-param name="+sip.instance">"<urn:gsma:imei:xxxxxxx-xxxxxx-x>" </unknown-param>
      <p-ani>P-Access-Network-Info: 3GPP-E-UTRAN-FDD;utran-cell-id-3gpp=310260xxxxxxxx </p-ani>
    </contact>
  </registration>
</reginfo>
```

*FIG. 5B*

```
?xml version="1.0"?><reginfo xmlns="urn:ietf:params:xml:ns:reginfo" version="1" state="full">
  <registration aor="sip:xx@xx" id="x" state="active">
    <contact id="x" state="active" event="created">
      <uri>sipxx@xx</uri>
      <unknown-param name="+g.3gpp.icsi-ref">"urn%3Aurn-7%3A3gpp-service.ims.icsi.mmtel" </unknown-param>
      <unknown-param name="+g.3gpp.smsip" />
      <unknown-param name="+sip.instance">"<urn:gsma:imei:xxxxxxx-xxxxxx-x>" </unknown-param>
      <p-ani>P-Access-Network-Info: 3GPP-E-UTRAN-FDD;utran-cell-id-3gpp=310260xxxxxxxx </p-ani>
    </contact>
  </registration>
</reginfo>
```

*FIG. 5C*

```
?xml version="1.0"?><reginfo xmlns="urn:ietf:params:xml:ns:reginfo" version="1" state="full">
<registration aor="sip:xx@xx" id="x" state="active">
<contact id="x" state="active" event="registered">
<uri>sipxx@xx</uri>
<unknown-param name="+g.3gpp.icsi-ref">"urn%3Aurn-7%3A3gpp-service.ims.icsi.mmtel" </unknown-param>
<unknown-param name="+g.3gpp.smsip" />
<unknown-param name="+sip.instance">"<urn:gsma:imei:xxxxxxxx-xxxxxx-x>" </unknown-param>
<p-ani>P-Access-Network-Info: 3GPP-E-UTRAN-FDD;utran-cell-id-3gpp=310260xxxxxxxxx </p-ani>
</contact>
<contact id="x" state="active" event="created">
<uri>sipxx@xx</uri>
<unknown-param name="+g.3gpp.icsi-ref">"urn%3Aurn-7%3A3gpp-service.ims.icsi.mmtel" </unknown-param>
<unknown-param name="+g.3gpp.smsip" />
<unknown-param name="+sip.instance">"<urn:uuid:xxxxxxxx-xxxxxx-x>" </unknown-param>
<p-ani>P-Access-Network-Info:IEEE-802.11a;i-wlan-node-id=xxxxxx </p-ani>
<p-lani>P-Last-Access-Network-Info:3GPP-E-UTRAN-FDD;utran-cell-id-3gpp=310260xxxxxxxxx </p-lani>
</contact>
</registration>
</reginfo>
```

```
?xml version="1.0"?><reginfo xmlns="urn:ietf:params:xml:ns:reginfo" version="1" state="full">
<registration aor="sip:xx@xx" id="x" state="active">
<contact id="x" state="active" event="registered">
<uri>sipxx@xx</uri>
<unknown-param name="+g.3gpp.icsi-ref">"urn%3Aurn-7%3A3gpp-service.ims.icsi.mmtel" </unknown-param>
<unknown-param name="+g.3gpp.smsip" />
<unknown-param name="+sip.instance">"<urn:gsma:imei:xxxxxxxx-xxxxxx-x>" </unknown-param>
<p-ani>P-Access-Network-Info: 3GPP-E-UTRAN-FDD;utran-cell-id-3gpp=310260xxxxxxxxx </p-ani>
</contact>
<contact id="x" state="active" event="created">
<uri>sipxx@xx</uri>
<unknown-param name="+g.3gpp.icsi-ref">"urn%3Aurn-7%3A3gpp-service.ims.icsi.mmtel" </unknown-param>
<unknown-param name="+g.3gpp.smsip" />
<unknown-param name="+sip.instance">"<urn:uuid:xxxxxxxx-xxxxxx-x>" </unknown-param>
<p-ani>P-Access-Network-Info:IEEE-802.11a;i-wlan-node-id=xxxxxx </p-ani>
<p-lani>P-Last-Access-Network-Info:3GPP-E-UTRAN-FDD;utran-cell-id-3gpp=310260xxxxxxxxx </p-lani>
</contact>
</registration>
</reginfo>
```

SIP IMS CALL FORKING TO MULTIPLE ASSOCIATED DEVICES

CROSS-REFERENCES TO RELATED APPLICATIONS

This application claims the benefit of U.S. Provisional Application No. 62/086,092, entitled "SIP IMS CALL FORKING TO MULTIPLE ASSOCIATED DEVICES," filed on Dec. 1, 2014, the entirety of which is hereby incorporated by reference.

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP" ™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core.

An IMS client (or IMS stack) software component on a mobile device allows one or more applications on the mobile device to register for various application services that are available on the IMS network, such as Voice over LTE (VoLTE), Rich Communication Services (RCS), Short Message Service over Internet Protocol (SMS over IP), and Presence. If the registration is successful, the mobile device application may then take advantage of the functionality offered by the application service to which it is registered. If the registration is unsuccessful, however, then the application will be unable to take advantage of the offered functionality.

Increasingly, mobile device users take advantage of multiple mobile devices to access services offered by an IMS network. For example, a single user may own a smartphone, a tablet computer, and a wearable device such as a watch that are all capable of using IMS services such as voice and video calls. In such instances, the user may wish to have the option of choosing which device to use in a given circumstance based on a variety of environmental factors and personal preferences. For example, a user may prefer to receive a video call on a tablet rather than on a smartphone, the user may prefer to receive voice calls only between certain hours, or the user may prefer to avoid receiving any IMS services on a device with a low battery level. Despite many such user preferences, however, traditional IMS networks typically forward an incoming call to a single default device rather than alerting multiple devices in order to give the user a choice of which device to use. As a result, mobile device users often experiences frustration by having no choice other than to take a call on a device that may not be optimal or convenient under the user's present circumstances. These and other problems exist within the current IMS architecture. Thus, the need exists for a system that overcomes the above problems, as well as one that provides additional benefits. Overall, the examples herein of some prior or related systems and any associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 5B illustrates an example extensible markup language (XML) document that the system may use to transmit a SIP NOTIFY message to a first associated device.

FIG. 5C illustrates an example XML document that the system may use to transmit a SIP NOTIFY message to one or more application servers.

FIG. 5E illustrates an example XML document that the system may use to transmit a SIP NOTIFY message to the second associated device.

FIG. 5F illustrates an example XML document that the system may use to transmit a SIP NOTIFY message to each respective application server.

DETAILED DESCRIPTION

The call forking technology disclosed herein allows a user to receive an incoming call on a preferred device, even if the call is placed to a different device associated with the user. For example, a user may own a smartphone, a tablet, and a personal digital assistant (PDA) that are each registered to the IMS network. The user may establish a rule that any incoming video call is to be delivered to the device having the highest Internet bandwidth connection, regardless of the actual device to which the video call is placed. Therefore, if a friend of the user places a video call to the user's smartphone, the system would instead deliver the video call to the user's tablet if the tablet had a relatively fast connection speed (such as 4G) as compared to a relatively slow connection speed (such as 3G) on the user's smartphone or PDA.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
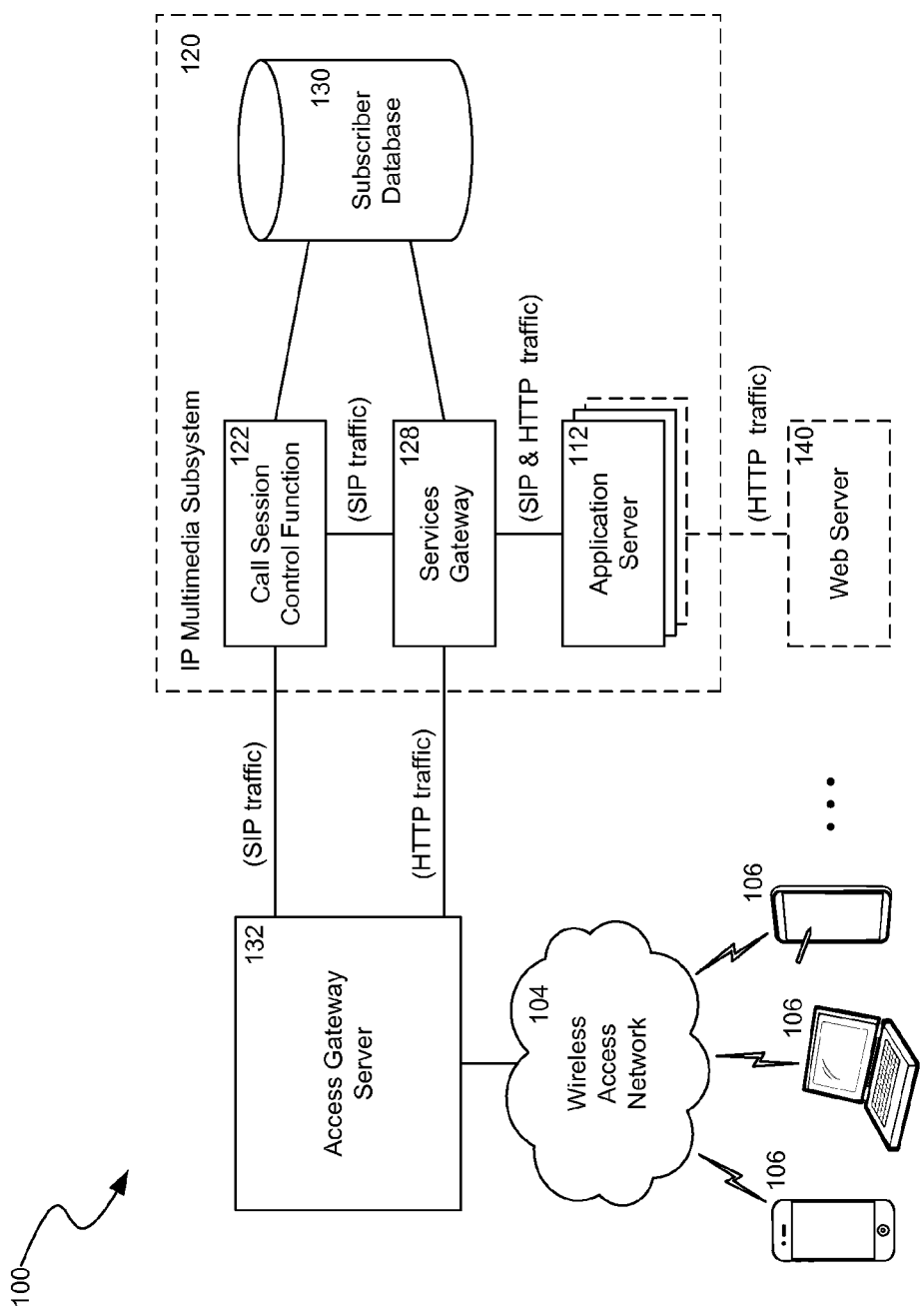
FIG. 1 is a block diagram that illustrates a suitable system 100 in which call forking to a group of associated devices may occur via an IMS network.

FIG. 1 is a block diagram that illustrates a system 100 in which signal routing or "call forking" to a group of associated devices may occur via an IMS network. One or more mobile devices 106 are connected via a wireless access network 104, to an access gateway server 132. In some embodiments, a large number of mobile devices 106 may be supported on the wireless access network 104. As explained in more detail below, two or more mobile devices 106 may be associated with a single user, thus allowing for more convenient communication routing.

The mobile devices 106 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the devices 106 as being "mobile," (i.e., configured to be carried and moved around) it is to be appreciated that the mobile devices 106 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Furthermore, the mobile devices 106 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

The connection across the wireless access network 104 is Internet Protocol (IP)-based, permitting the delivery of Session Initiation Protocol network traffic as well as HTTP network traffic. The access gateway server 132 is connected to an IP Multimedia Subsystem 120. SIP traffic flows between the access gateway server 132 and one or more Call Session Control Function servers 122, which are located within the IMS 120. Additional details of the IMS 120, including the Call Session Control Function servers 122, may be found in the Applicant's U.S. Pat. No. 8,762,559, entitled "System and Method for Non-IMS Application Service Access Over IP Multimedia Subsystem," filed on Dec. 16, 2011, which is herein incorporated by reference in its entirety. Various details are illustrated in a simplified manner herein for the sake of brevity; however, a person having ordinary skill in the art will understand the details necessary for an implementation of the disclosed technology without undue experimentation.

The Call Session Control Function servers 122 are communicatively coupled with a subscriber database 130, which may be utilized during the IMS registration process for registering users and their communication devices with the IMS 120. Registration with the IMS may include verifying the user's identity, recording a device ID for their communication device(s), checking the user's payment history, and other functions. In addition, the subscriber database 130 may keep track of a list of security associations, online applications that the user is allowed to access or that the user is not allowed to access, or rules governing how call forking is carried out among multiple devices that are associated with the user.

Figure 2:
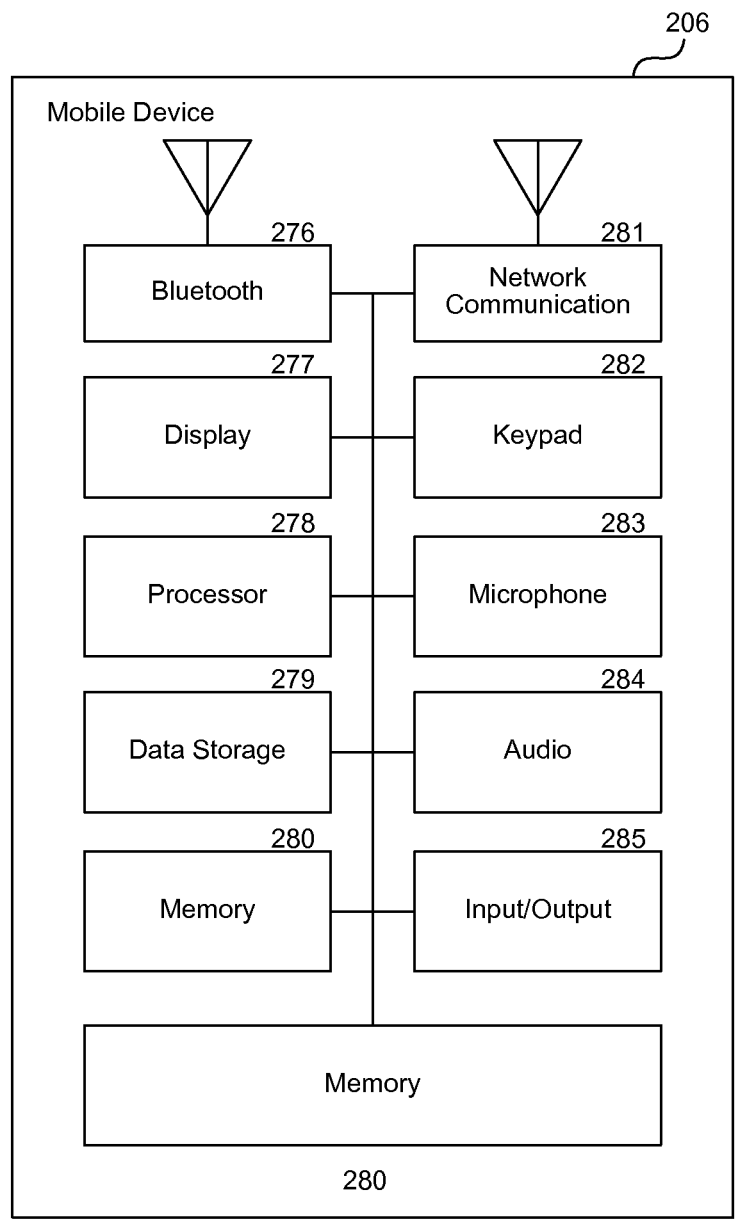
FIG. 2 is a block diagram of a representative mobile device that may request IMS services and receive a forked call via the IMS network.

FIG. 2 is a block diagram of a representative mobile device that may request IMS services and receive a forked call via the IMS network. Each mobile device 106 typically includes a processor 278 for executing processing instructions, a data storage medium component 279 (e.g., hard drive, flash memory, memory card, etc.), volatile memory and/or nonvolatile memory 280, a power supply, one or more network interfaces (e.g., Bluetooth Interface 276; and Network Communication Interface 281, which enables the mobile phone to communicate by transmitting and receiving wireless signals using licensed, semi-licensed or unlicensed spectrum over a telecommunications network), an audio interface 284, a display 277, a keypad or keyboard 282, a microphone 283, and other input and/or output interfaces 285. The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP clients capable of generating, transmitting and interpreting syntactically correct SIP messages. SIP clients permit the mobile device to register with and communicate via the IMS network.

In order to register with the IMS network, an SIP client running on a mobile device 106 generates and sends an initial SIP registration message to the IMS network. The initial registration message may comprise a REGISTER method token and extended header information, including an IMEI and International Mobile Subscriber Identity (IMSI), or a UUID, associated with the mobile device 106, P-Access-Network-Info, and Contact Header information that may include an identification of one or more requested IMS services. A Proxy Call Session Control Function (P-CSCF) residing within the IMS network receives the initial SIP registration message and forwards the message to an Interrogating Call Session Control Function (I-CSCF) within the IMS network. One skilled in the art will appreciate that in some examples, the P-CSCF may also perform some or all of the functionality of multiple components within the IMS network.

A Home Subscriber Server (HSS) residing within the IMS network is a master user database that contains subscription-related information such as subscriber profiles. The HSS performs authentication and authorization of a mobile device 106 and provides information about a mobile device's IP address. The HSS may perform standard IMS registration processes as described by 3GPP specifications and standards. The HSS also validates the IMEI/IMSI/UUID identifiers in the User Authorization Request (UAR) in order to determine whether to deny registration to a mobile device 202. The HSS may also use a received IMEI/IMSI/UUID to determine the capabilities of a mobile device.

Figure 3A:
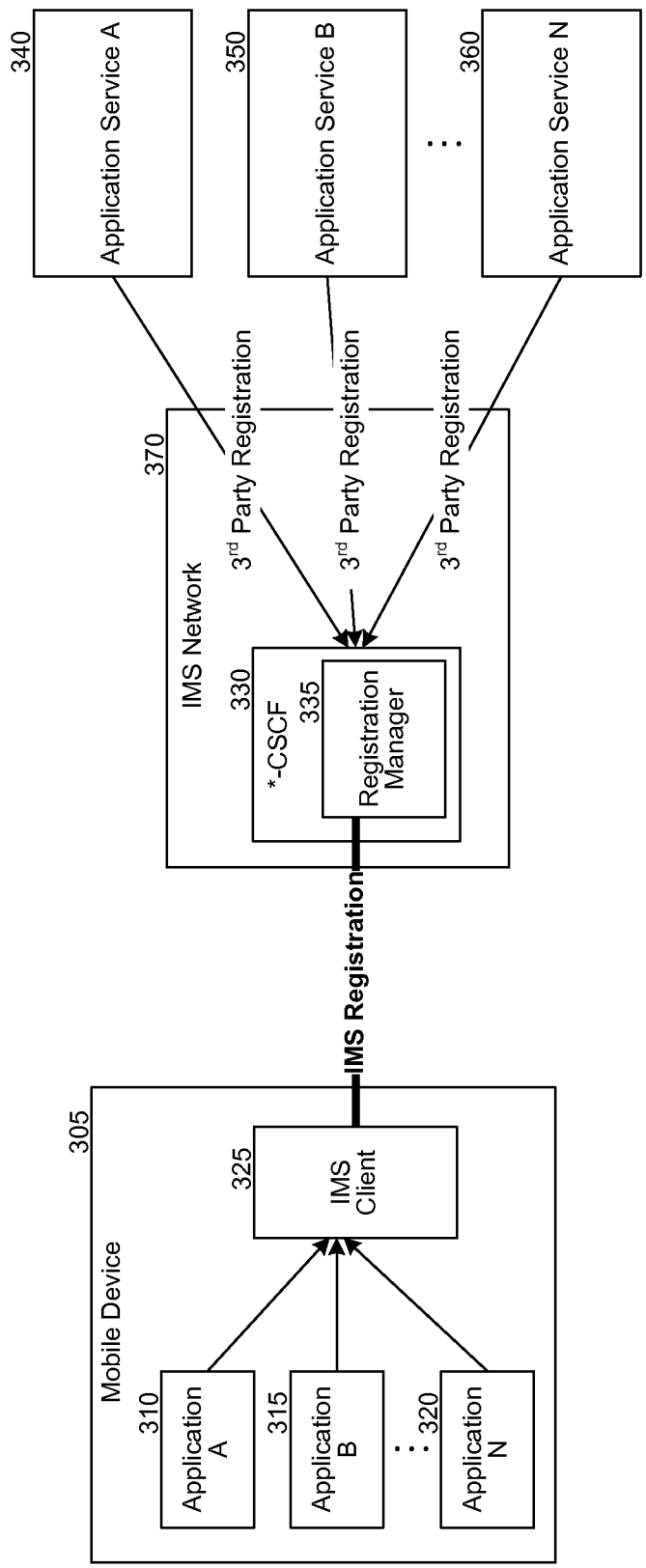
FIG. 3A is a block diagram providing a simplified view of registration and delivery of IMS application services to mobile devices.

FIG. 3A is a block diagram providing a simplified view of the registration and delivery of IMS application services to mobile devices. Applications running in the mobile device 106 use an IMS client 325 to register for application services in the IMS network. The IMS client (or IMS stack) maintains an IMS registration as long as an application needs to stay connected with a corresponding application service. The IMS proxies (*-CSCFs) 330 in the IMS network maintain the registration initiated by the mobile device and provide the appropriate routing for IMS traffic. When for any reason one of the application servers involved rejects the initial registration request, the IMS service is not available to the mobile device and the application functionality on the mobile device may be substantially or completely impacted by the registration failure.

In FIG. 3A, three applications on the mobile device 106 are depicted as using applications services, namely application A (310), application B (315), and application N (320). Applications on the mobile device communicate with the IMS network through IMS client 325. The IMS client 325 resides within the mobile device and manages communications between mobile device applications and other components in the IMS network. For example, IMS client 325 receives registration requests from the mobile device applications (310, 315, and 320), forwards the received registration requests to IMS network 370, receives registration status notification subscription requests from the mobile device applications, and forwards the received registration status notification subscription requests to the IMS network. In some embodiments, the IMS client 325 additionally receives registration status notifications from the application services 340, 350, and 360 and forwards the received status notifications to the appropriate mobile device applications. Those skilled in the art will appreciate that the IMS client 325 may be implemented in an Android™, Windows™, iOS™, or other operating system environment that is used by mobile devices.

The IMS client 325 connects to a registration manager component 335 within one or more of the CSCF 330 in the IMS network. The registration manager component 335 resides within the IMS network and manages registrations between one or more mobile device applications 310, 315, and 320 and one or more application services 340, 350, and 360. For example, registration manager 335 receives registration requests from the mobile device applications, queries a policy database of whitelisted IMS services, forwards the request for whitelisted services to the appropriate application servers, receives registration status notification subscription requests from the IMS client, and forwards the received registration status notification subscription requests to the appropriate application servers. In some embodiments, registration manager 335 may receive a single request that functions as both a registration request and a registration status notification subscription request.

Figure 3B:
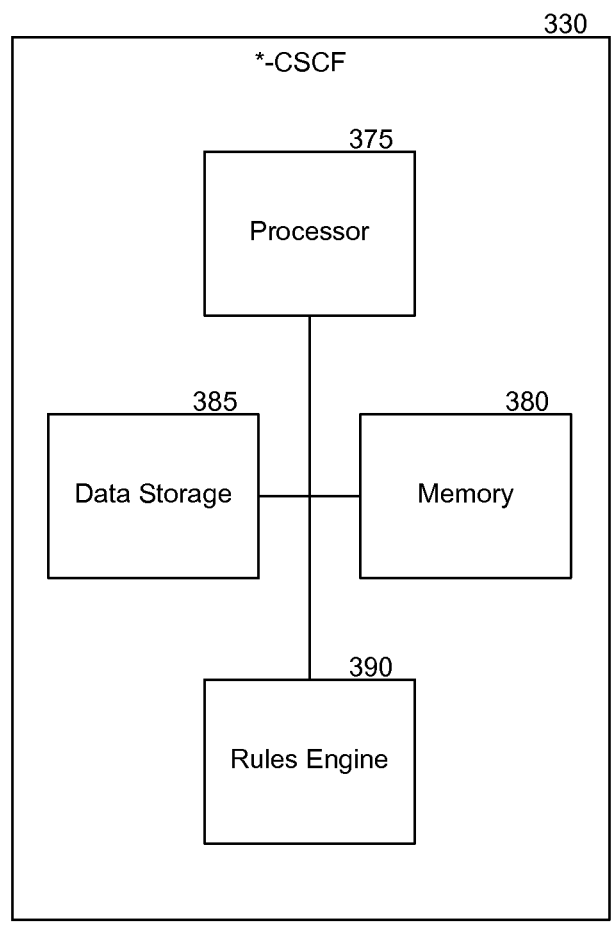
FIG. 3B is a block diagram of a Call Session Control Function (CSCF) 230 node within IMS network 270 which implements the functionality of the registration manager component 235.

FIG. 3B is a block diagram of a CSCF 330 node within IMS network 370 which implements the functionality of the registration manager component 335. The CSCF 330 may contain one or more processors 375 for executing processing instructions, a data storage medium component 385 (e.g., hard drive, flash memory, memory card, etc.), a volatile memory and/or nonvolatile memory 380, and a rules engine 390. Although depicted separately, it will be appreciated that rules engine 390 may be incorporated into data storage 385 or memory 380, or may be incorporated into a component that is external to CSCF 330. Instructions for implementing functions of the registration manager 335 may be stored in the data storage medium and/or memory and executed by the processor. While the registration manager component 335 functionality is depicted as residing within the CSCF 330 in FIG. 3A, it will be appreciated that the registration manager component 335 may be implemented independently from the CSCF 330. That is, the registration manager component 335 may be operated as a stand-alone service within the IMS network 370 or may be incorporated in other network nodes within the IMS network 370. Additional details regarding IMS registration and notifications may be found in the Applicant's U.S. Pat. No. 8,611,890, entitled "System and Method for Subscribing for Internet Protocol Multimedia Subsystems (IMS) Services Registration Status"; and U.S. patent application Ser. No. 14/335,836, entitled "Enhanced IMS Services Restriction and Selection Control for Mobile Devices Roaming in Foreign Networks," the entirety of which is herein incorporated by reference. Additional details are further provided in Applicant's co-pending U.S. patent application Ser. No. 14/729,025, entitled "SPI Handling between UE and P-CSCF in an IMS Network," filed on Jun. 2, 2015, the entirety of which is hereby incorporated by reference.

Figure 4:
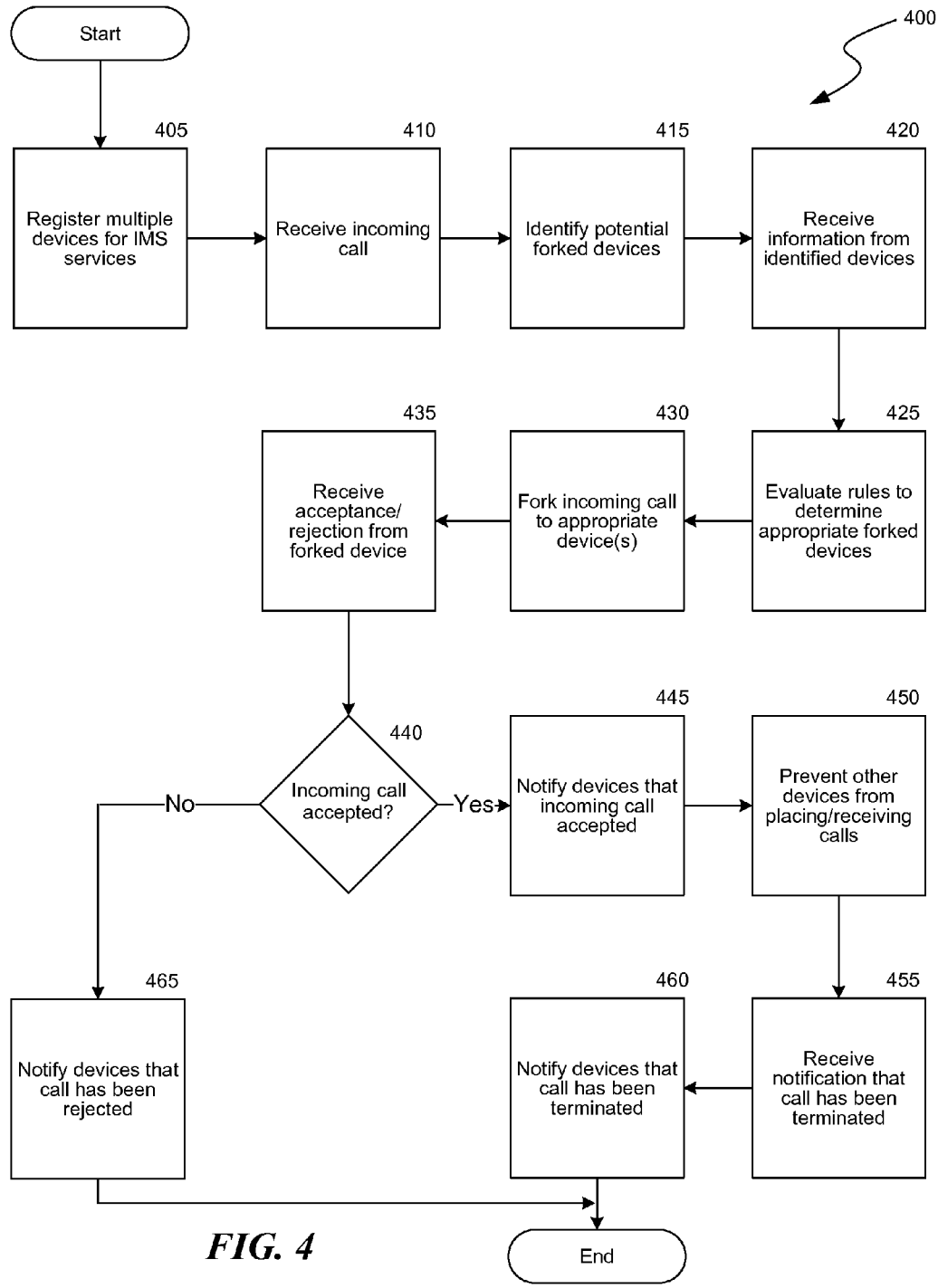
FIG. 4 is a flow diagram illustrating a simplified view of call forking to multiple associated devices via an IMS network.

FIG. 4 is a flow diagram illustrating a simplified view of call forking to multiple associated devices via an IMS network under the present system. At step 405, two or more devices that are associated with a single user (i.e., associated devices) register for one or more IMS services. As explained above, the registration is typically accomplished by transmitting an SIP REGISTER command from each associated device towards one or more IMS network components, such as a P-CSCF, I-CSCF, or a Service Call Session Control Function (S-CSCF). For example, a first associated device may correspond to a user's smartphone, a second associated device may correspond to a tablet device that belongs to the user, a third associated device may correspond to a digital camera or a vehicle-mounted computer that belongs to the user, and a fourth associated device may correspond to a wearable device (e.g., a watch) that belongs to the user. Each of the associated devices may register for one or more IMS services, such as Voice over LTE (VoLTE), Voice over WiFi (VoWiFi), Rich Communication Services (RCS), Short Message Service over Internet Protocol (SMS over IP), Presence, and various videoconferencing and multimedia streaming technologies, to name a few. Each of the associated devices may register for the same IMS services or for different IMS services in accordance with user preferences and the inherent capabilities of each respective device. Each of the associated devices may be identified by a unique or a semi-unique identifier that enables the system to distinguish among the associated devices. For example, a device may be associated with an International Mobile Station Equipment Identity (IMEI) number, a universally unique identifier (UUID), or any other serial number or code that is sufficient to distinguish the device from other devices that register for IMS services. In the case of a single user who uses multiple devices that are registered to the IMS network, each of the multiple devices may share a common group identifier such as an Address of Record (AOR). As explained in more detail below, the group identifier enables multiple devices to be associated with a single user so that IMS services may be forked to multiple devices belonging to the single user (i.e., associated devices).

At step 410, the IMS network receives an incoming call corresponding to an IMS service for which one or more devices is registered. For example, if a smartphone belonging to a user is registered for VoLTE, the IMS network may receive a VoLTE call that is destined for the registered smartphone (i.e., the requested device). At step 415, the system determines one or more devices that are associated with the requested device. For example, the system may determine an IMEI or UUID associated with the requested device and identify other registered devices sharing the same IMEI or UUID. As described in more detail below, the system evaluates the associated devices to determine which, if any, of the associated devices should receive notification of the incoming call to the requested device. At step 420, the system retrieves information from the requested device and the associated devices. Such information may include but is not limited to location information (e.g., geographical location; an indication of whether the device is presently located at the user's home, office, car, etc.), speed, battery life, connection bandwidth, temperature, or other environmental, contextual or system information associated with the requested device and/or associated devices.

At step 425, the system determines which of the requested and associated devices should receive notification of the incoming call. To determine which devices should receive the notification, the system may apply a series of user-defined and/or service provider-defined rules. Rules may be specified based on the type of incoming call, call originator, time of day, battery life, location, or any number of additional factors. For example, a user or service provider may specify a set of rules including one or more of the following:

- Voice calls received between 10 a.m. and 10 p.m. are delivered to smartphone and tablet
- Voice calls not received between 10 a.m. and 10 p.m. are delivered to smartphone only
- When tablet is located at user's home, voice calls are delivered to tablet and smartphone
- When tablet is located outside of user's home, voice calls are not delivered to tablet
- When smartphone battery level is below 30%, video calls are not delivered to smartphone
- When the smartphone connection currently has only a 3G connection, large attachments, large files or other data requiring large bandwidth are delivered to a tablet or laptop having a 4G or WiFi connection Using the above rules, for example, a voice call placed to the user's tablet at 11:00 a.m. while the tablet is located inside the user's home would cause the system to determine that the voice call should be forked to the user's smartphone and the user's tablet. If the same voice call is received while the tablet is located in the user's office rather than the user's home, then the system would determine that the voice call should be forked to the smartphone only (because the rules specify that voice calls are not delivered to the tablet when the tablet is outside of the user's home). As another example, if a video call is placed to the user's smartphone while the battery level of the smartphone is 25%, the system would determine that the video call should not be forked to the user's smartphone. Instead, in the absence of a specific rule that specifies that the video call should be forked to the user's tablet, the system may nonetheless take a default action to fork the video call to the user's tablet if the tablet is capable of servicing the video call. A person of ordinary skill in the art will appreciate that the user or the system operator may establish default rules that govern how calls are forked when no specific rule exists for a given set of parameters. A person of ordinary skill will also appreciate that if a user-defined rule conflicts with a rule that is established by a service provider, the system will enforce the rule established by the service-provider.

A person of ordinary skill will further appreciate that the system may apply user-configurable or default rules to subsequent incoming calls that are received after a previously received call has been forked to a device, particularly when the previously received call is still in progress. For example, if the system determines that a first video call should be forked to the user's tablet because the user's smart phone has a low battery charge, the system may nonetheless determine that a subsequent video call should be forked to the user's smart phone if the first video call (on the tablet) is still in progress. Alternatively, the system may determine that the subsequent video call should be forked to the user's tablet regardless of whether the first video call is still in progress. A person of ordinary skill will appreciate that any number of additional configurations is possible. For example, the system may determine that a subsequent call should be forked to a different device than a previous call if the user did not answer the previous call, or the system may determine that a subsequent call should be sent to the user's voicemail and not forked to any device if the previous call is still in progress.

At step 430, the system forks the incoming call to the one or more determined appropriate devices (e.g., a smartphone and/or tablet), each of which is registered on the IMS network. As explained in more detail with regard to FIG. 5A et al., the system may fork the incoming call to one or more determined appropriate devices by transmitting an INVITE message towards each of the one or appropriate devices via the IMS network such that each appropriate device receives a respective INVITE request. Upon receiving the INVITE message, each of the receiving devices may present a notification on the device to alert the user of the incoming call and provide the user with an option to accept or decline the incoming call. At step 435, the system receives a request from one of the receiving devices to either accept or decline the incoming call (in accordance with the user's response to the notification presented on the device). If the call is rejected at step 440, the system notifies the associated devices that the call has been rejected (step 465). Upon receipt of the call rejection notification, each of the associated devices may cancel or otherwise discontinue the presentation of the user alert corresponding to the rejected call. If the call is accepted at step 440, the system notifies the associated devices that the call has been accepted (step 445). Upon receipt of the call acceptance notification (or upon a timeout of the request due to a lack of response from the device), each of the associated devices may cancel or otherwise discontinue the presentation of an alert corresponding to the rejected call. At step 450 (in the case that the call has been accepted by one device), the system prevents the other associated devices from making or receiving calls while the accepted call is in session. When the call is terminated, the system receives a notification that the accepted call has ended (step 455), and the system notifies the associated devices that the call is no longer in process (step 460).

Figure 5A:
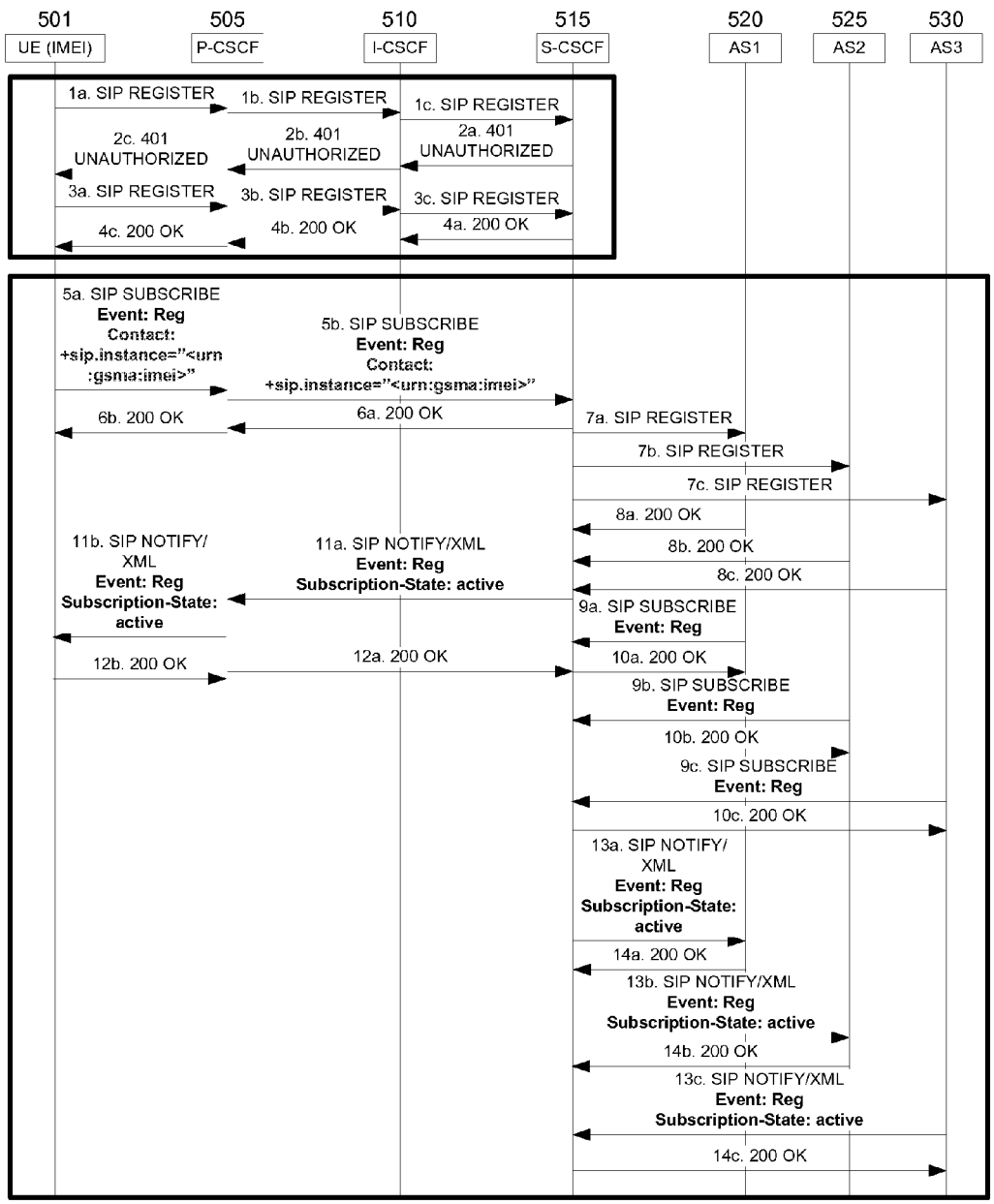
FIG. 5A is a call flow diagram illustrating an IMS network registration for a first associated device that is identified by an International Mobile Equipment Identity (IMEI) number.

FIG. 5A is a call flow diagram illustrating an IMS network registration for a first associated device 501 that is identified by an IMEI. An SIP REGISTER message is transmitted from the first associated device towards P-CSCF 505 (step 1a), then towards I-CSCF 510 (step 1b), and then towards S-CSCF 515 (step 1c). A 401 SIP UNAUTHORIZED message is transmitted from S-CSCF 515 towards I-CSCF 510 (step 2a), then towards P-CSCF 505 (step 2b), and then towards P-CSCF 505 (step 2c). A second SIP REGISTER message is transmitted from the first associated device towards P-CSCF 505 (step 3a), then towards I-CSCF 510 (step 3b), and then towards S-CSCF 515 (step 3c). A 200 OK message is sent from S-CSCF 515 towards I-CSCF 510 (step 4a), then towards P-CSCF 505 (step 4b), and then towards P-CSCF 505 (step 4c).

After the first authorized device is registered to the IMS network, the device may register to receive registration status notification updates, typically by transmitting an SIP SUBSCRIBE message. An SIP SUBSCRIBE message is transmitted from the first associated device 501 towards P-CSCF 505 (step 5a), then towards S-CSCF 510 (step 5b). A 200 OK message is transmitted from S-CSCF 515 towards P-CSCF 505 (step 6a), and then towards the first associated device 501 (step 6b). S-CSCF 515 transmits an SIP REGISTER message towards Application Server (AS) 520 (step 7a), AS 525 (step 7b), and AS 530 (step 7c).

Similarly, one or more application servers may register to receive registration status notification updates. AS1 520 transmits a 200 OK message towards S-CSCF 515 at step 8a, AS2 525 transmits a 200 OK towards S-CSCF 515 at step 8b, and AS3 530 transmits a 200 OK towards S-CSCF 515 at step 8c. AS1 520 transmits an SIP SUBSCRIBE towards S-CSCF 515 at step 9a, AS2 525 transmits SIP SUBSCRIBE towards S-CSCF 515 at step 9b, and AS3 530 transmits SIP SUBSCRIBE towards S-CSCF 515 at step 9c. S-CSCF 515 transmits a 200 OK message towards AS1 520 at step 10a, S-CSCF 515 transmits a 200 OK message towards AS2 525 at step 10b, and S-CSCF 515 transmits a 200 OK message towards AS3 530 at step 10c.

After the first associated device has subscribed to receive registration status updates, the device is capable of receiving updates via SIP NOTIFY messages. At step 11a, S-CSCF 515 transmits an SIP NOTIFY message towards P-CSCF 505. At step 11b, P-CSCF 505 transmits the SIP NOTIFY message towards the first associated device 501. At step 12a, P-CSCF 505 transmits a 200 OK message towards P-CSCF 505. At step 12b, P-CSCF 505 transmits the 200 OK message towards S-CSCF 515. In steps 11a-11b, the system may transmit the SIP NOTIFY message in the form of an extensible markup language (XML) document. FIG. 5B illustrates an example XML document that the system may use to transmit a SIP NOTIFY message to the first associated device. The XML document includes multiple parameters, including for example an "aor" parameter that identifies each piece of user equipment (e.g., an IMEI or UUID), one or more "name" parameters that correspond to individual IMS services, and a "state" parameter that indicates whether a respective registration is active or terminated. In addition, the XML document may include a P-Access-Network-Info parameter that may be used to convey a variety of information associated with an associated device, such as a physical or logical location of the associated device. In an embodiment, an SIP MESSAGE/200OK or SIP INFO/200OK can be used instead of the SIP SUBSCRIBE/NOTIFY framework. Additional information regarding the P-Access-Network-Info parameter and other relevant parameters may be found in Applicant's co-pending U.S. patent application Ser. No. 14/678,413, entitled "P-LANI AND PIDF-LO," filed on Apr. 3, 2015, which is herein incorporated by reference in its entirety Similarly, after the one or more application servers have subscribed to receive registration status updates, the respective application servers are capable of receiving updates via SIP NOTIFY messages. S-CSCF 515 transmits an SIP NOTIFY message towards AS1 520 (step 13a), transmits an SIP NOTIFY message towards AS2 525 (step 13b), and transmits an SIP NOTIFY message towards AS3 530 (step 13c). AS1 520 transmits a 200 OK message towards S-CSCF 515 (step 14a), AS2 525 transmits a 200 OK message towards S-CSCF 515 (step 14b), and AS3 530 transmits a 200 OK message towards S-CSCF 515 (step 14c). In steps 13a-13c, the system may transmit the SIP NOTIFY message in the form of an extensible markup language (XML) document. FIG. 5C illustrates an example XML document that the system may use to transmit a SIP NOTIFY message to each respective application server. The XML document includes multiple parameters, including for example an "aor" parameter that identifies each piece of user equipment (e.g., an IMEI or UUID), one or more "name" parameters that correspond to individual IMS services, and a "state" parameter that indicates whether a respective registration is active or terminated. In addition, the XML document may include a P-Access-Network-Info parameter that may be used to convey a variety of information associated with an associated device, such as a physical or logical location of the associated device. In an embodiment, an SIP MESSAGE/200OK or SIP INFO/200OK can be used instead of the SIP SUBSCRIBE/NOTIFY framework.

Figure 5D:
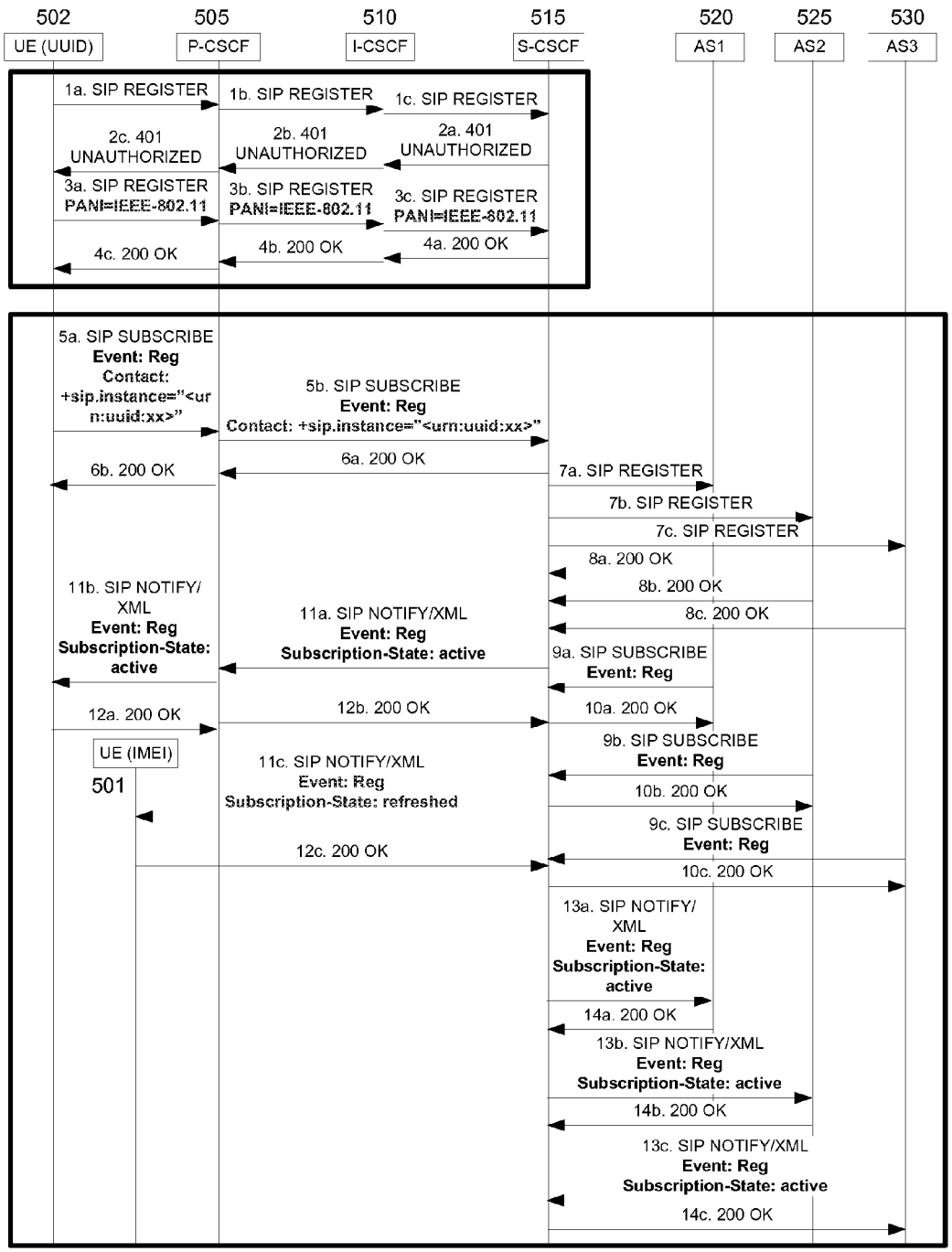
FIG. 5D is a call flow diagram illustrating an IMS network registration for a second associated device 502 that is identified by a universally unique identifier (UUID).

FIG. 5D is a call flow diagram illustrating an IMS network registration for a second associated device 502 that is identified by a UUID. An SIP REGISTER message is transmitted from the second associated device towards P-CSCF 505 (step 1a), then towards I-CSCF 510 (step 1b), and then towards S-CSCF 515 (step 1c). A 401 SIP UNAUTHORIZED message is transmitted from S-CSCF 515 towards I-CSCF 510 (step 2a), then towards P-CSCF 505 (step 2b), and then towards P-CSCF 505 (step 2c). A second SIP REGISTER message is transmitted from the second associated device towards P-CSCF 505 (step 3a), then towards I-CSCF 510 (step 3b), and then towards S-CSCF 515 (step 3c). The second SIP REGISTER message includes P-Access-Network-Information (PANI) that indicates that the second associated device is located on an IEEE 802.11 WiFi network. A 200 OK message is sent from S-CSCF 515 towards I-CSCF 510 (step 4a), then towards P-CSCF 505 (step 4b), and then towards P-CSCF 505 (step 4c).

After the second authorized device is registered to the IMS network, the device may register to receive registration status notification updates, typically by transmitting an SIP SUBSCRIBE message. An SIP SUBSCRIBE message is transmitted from the second associated device 502 towards P-CSCF 505 (step 5a), then towards S-CSCF 510 (step 5b). A 200 OK message is transmitted from S-CSCF 515 towards P-CSCF 505 (step 6a), and then towards the second associated device 501 (step 6b). S-CSCF 515 transmits an SIP REGISTER message towards Application Server (AS) 520 (step 7a), AS 525 (step 7b), and AS 530 (step 7c).

Similarly, one or more application servers may register to receive registration status notification updates. AS1 520 transmits a 200 OK message towards S-CSCF 515 at step 8a, AS2 525 transmits a 200 OK towards S-CSCF 515 at step 8b, and AS3 530 transmits a 200 OK towards S-CSCF 515 at step 8c. AS1 520 transmits an SIP SUBSCRIBE towards S-CSCF 515 at step 9a, AS2 525 transmits SIP SUBSCRIBE towards S-CSCF 515 at step 9b, and AS3 530 transmits SIP SUBSCRIBE towards S-CSCF 515 at step 9c. S-CSCF 515 transmits a 200 OK message towards AS1 520 at step 10a, S-CSCF 515 transmits a 200 OK message towards AS2 525 at step 10b, and S-CSCF 515 transmits a 200 OK message towards AS3 530 at step 10c.

After the second associated device has subscribed to receive registration status updates, the device is capable of receiving updates via SIP NOTIFY messages. At step 11a, S-CSCF 515 transmits an SIP NOTIFY message towards P-CSCF 505. At step 11b, P-CSCF 505 transmits the SIP NOTIFY message towards the second associated device 501. At step 11c, S-CSCF 515 transmits the SIP NOTIFY message towards the first associated device 501. At step 12a, P-CSCF 505 transmits a 200 OK message towards P-CSCF 505. At step 12b, P-CSCF 505 transmits the 200 OK message towards S-CSCF 515. At step 12c, the second associated device 501 transmits the 200 OK message towards S-CSCF 515. In steps 11a-11c, the system may transmit the SIP NOTIFY message in the form of an extensible markup language (XML) document. FIG. 5E illustrates an example XML document that the system may use to transmit a SIP NOTIFY message to the second associated device. The XML document comprises a first section 540 corresponding to the first associated device and a second section 545 corresponding to the second associated device. Each section of the XML document includes multiple parameters, including for example an "aor" parameter that identifies each piece of user equipment (e.g., an IMEI or UUID), one or more "name" parameters that correspond to individual IMS services, and a "state" parameter that indicates whether a respective registration is active or terminated. In addition, the XML document may include a P-Access-Network-Info parameter that may be used to convey a variety of information associated with an associated device, such as a physical or logical location of the associated device.

Similarly, after the one or more application servers have subscribed to receive registration status updates, the respective application servers are capable of receiving updates via SIP NOTIFY messages. S-CSCF 515 transmits an SIP NOTIFY message towards AS1 520 (step 13a), transmits an SIP NOTIFY message towards AS2 525 (step 13b), and transmits an SIP NOTIFY message towards AS3 530 (step 13c). AS1 520 transmits a 200 OK message towards S-CSCF 515 (step 14a), AS2 525 transmits a 200 OK message towards S-CSCF 515 (step 14b), and AS3 530 transmits a 200 OK message towards S-CSCF 515 (step 14c). In steps 13a-13c, the system may transmit the SIP NOTIFY message in the form of an extensible markup language (XML) document. FIG. 5F illustrates an example XML document that the system may use to transmit a SIP NOTIFY message to each respective application server. The XML document comprises a first section 550 corresponding to the first associated device and a second section 555 corresponding to the second associated device. Each section of the XML document includes multiple parameters, including for example an "aor" parameter that identifies each piece of user equipment (e.g., an IMEI or UUID), one or more "name" parameters that correspond to individual IMS services, and a "state" parameter that indicates whether a respective registration is active or terminated. In addition, the XML document may include a P-Access-Network-Info parameter that may be used to convey a variety of information associated with an associated device, such as a physical or logical location of the associated device. In an embodiment, an SIP MESSAGE/200OK or SIP INFO/200OK can be used instead of the SIP SUBSCRIBE/NOTIFY framework.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph112(f) (AIA), other aspects may likewise be embodied as a means-plus-function claim, or in other forms, such as being embodied in a computer-readable medium. (Any claims intended to be treated under 35 U.S.C. §112, ¶6(f) will begin with the words "means for", but use of the term "for" in any other context is not intended to invoke treatment under 35 U.S.C. §112, ¶6(f).) Accordingly, the applicant reserves the right to pursue additional claims after filing this application to pursue such additional claim forms, in either this application or in a continuing application.

We claim:

1. A computer-implemented method in an Internet Protocol Multimedia Subsystem (IMS) network to transmit an incoming call request to one or more mobile devices, the method comprising:
   receiving, for each of multiple mobile devices, a request to register the device for one or more IMS services,
      wherein the request includes a first identifier that identifies the mobile device and a second identifier that is associated with a user of the mobile device;
   receiving an incoming call to a destination mobile device,
      wherein the incoming call is at least partially received over the IMS network, and
      wherein the destination mobile device is one of the multiple mobile devices;
   identifying one or more associated mobile devices, the one or more associated mobile devices having the same second identifier as the destination mobile device;
   determining one or more forked devices, the one or more forked devices comprising at least one of the destination mobile device and the one or more associated mobile devices;
   transmitting a first notification to each forked device over the IMS network,
      wherein the first notification indicates that the forked device may accept or reject the incoming call request, and
      wherein the first notification is displayed on the destination device such that a user of the destination mobile device is provided with an option to accept or reject the incoming call;
   receiving an acceptance or rejection from at least one of the one or more forked devices; and
   in response to receiving an acceptance, preventing one or more forked devices from initiating a second call while the incoming call is in progress.

2. The computer-implemented method of claim 1, wherein the incoming call is a Voice over LTE (VoLTE) call.

3. The computer-implemented method of claim 1, wherein the incoming call is a Voice over WiFi (VoWiFi) call.

4. The computer-implemented method of claim 1, wherein the first identifier is an International Mobile Station Equipment Identity (IMEI) number or a universally unique identifier (UUID).

5. The computer-implemented method of claim 1, wherein the one or more forked devices are determined based on a bandwidth connection to the one or more forked devices.

6. The computer-implemented method of claim 1, wherein the one or more forked devices are determined based on a time of day during which the incoming call is received.

7. The computer-implemented method of claim 1, wherein the one or more forked devices are determined based on a battery or charge level of the destination mobile device and/or the one or more associated mobile devices.

8. The computer-implemented method of claim 1, wherein the one or more forked devices are determined based on a location of the destination mobile device and/or the one or more associated mobile devices.

9. The computer-implemented method of claim 1, further comprising transmitting a second notification to one or more forked devices, the second notification indicating that the incoming call request has been accepted or rejected.

10. The computer-implemented method of claim 1, further comprising preventing one or more forked devices from receiving a second call while the incoming call is in progress.

11. A non-transitory computer-readable medium storing instructions that, when executed by a processor in an Internet Protocol Multimedia Subsystem (IMS) network, cause the IMS network to transmit an incoming call request to one or more mobile devices, comprising:
   receiving an incoming call to a destination mobile device, the destination mobile device being one of multiple mobile devices,
      wherein each of the multiple mobile devices is registered for one or more IMS services using a first identifier identifying the mobile device and a second identifier identifying a user of the mobile device;
   identifying one or more associated mobile devices, the one or more associated mobile devices having the same second identifier as the destination mobile device;
   determining one or more forked devices, the one or more forked devices comprising at least one of the destination mobile device and the one or more associated mobile devices; and,
   transmitting a first notification to each forked device, the first notification indicating that the forked device may accept or reject the incoming call request,
      wherein the first notification is displayed on the destination device such that a user of the destination mobile device is provided with an option to accept or reject the incoming call;
   receiving an acceptance or rejection from at least one of the one or more forked devices; and
   in response to receiving an acceptance, preventing one or more forked devices from initiating a second call while the incoming call is in progress.

12. The computer-readable medium of claim 11, wherein the incoming call is a Voice over LTE (VoLTE) call, or a Voice over WiFi (VoWiFi) call.

13. The computer-readable medium of claim 11, wherein the first identifier is an International Mobile Station Equipment Identity (IMEI) number or a universally unique identifier (UUID).

14. The computer-readable medium of claim 11, wherein the one or more forked devices are determined based on a time of day during which the incoming call is received.

15. The computer-readable medium of claim 11, wherein the one or more forked devices are determined based on a battery or charge level of the destination mobile device and/or the one or more associated mobile devices.

16. The computer-readable medium of claim 11, wherein the one or more forked devices are determined based on a location of the destination mobile device and/or the one or more associated mobile devices.

17. The computer-readable medium of claim 11, further comprising transmitting a second notification to one or more forked devices, the second notification indicating that the incoming call request has been accepted or rejected.

18. The computer-readable medium of claim 11, further comprising preventing one or more forked devices from initiating or receiving a second call while the incoming call is in progress.

19. The computer-readable medium of claim 11, wherein the one or more forked devices are determined based on a bandwidth connection to the one or more forked devices.

20. A system to permit an Internet Protocol Multimedia Subsystem (IMS) network to transmit an incoming call request to one or more mobile devices, the system comprising:

at least one processor;
memory, coupled to the at least one processor, and storing instructions for performing a method comprising;
  receiving an incoming call to a destination mobile device, the destination mobile device being one of multiple mobile devices,
    wherein each of the multiple mobile devices is registered for one or more IMS services using a first identifier identifying the mobile device and a second identifier identifying a user of the mobile device;
  identifying one or more associated mobile devices, the one or more associated mobile devices having the same second identifier as the destination mobile device;
  determining one or more forked devices, the one or more forked devices comprising at least one of the destination mobile device and the one or more associated mobile devices;
  transmitting a first notification to each forked device, the first notification indicating that the forked device may accept or reject the incoming call request, wherein the first notification is displayed on the destination device such that a user of the destination mobile device is provided with an option to accept or reject the incoming call;
  receiving an acceptance or rejection from at least one of the one or more forked devices; and
  in response to receiving an acceptance, preventing one or more forked devices from initiating a second call while the incoming call is in progress.

* * * * *